United States Patent
Deng et al.

(10) Patent No.: US 12,039,747 B1
(45) Date of Patent: Jul. 16, 2024

(54) POLARITY DISCRIMINATION DETECTION METHOD AND APPARATUS FOR MULTIPLE STACKED ELECTRONIC COMPONENTS AND DEVICE

(71) Applicant: GUANGDONG UNIVERSITY OF TECHNOLOGY, Guangzhou (CN)

(72) Inventors: Yaohua Deng, Guangzhou (CN); Shengyu Lin, Guangzhou (CN); Xiali Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/611,630

(22) Filed: Mar. 20, 2024

(30) Foreign Application Priority Data

Nov. 8, 2023 (CN) .......................... 202311475284.5

(51) Int. Cl.
*G06T 7/593* (2017.01)
*G06T 3/60* (2024.01)
(Continued)

(52) U.S. Cl.
CPC ................ *G06T 7/593* (2017.01); *G06T 3/60* (2013.01); *G06T 5/20* (2013.01); *G06T 5/92* (2024.01);
(Continued)

(58) Field of Classification Search
CPC .. G06T 7/593; G06T 3/60; G06T 5/20; G06T 5/92; G06T 7/187; G06V 10/46; G06V 10/751
See application file for complete search history.

(56) References Cited

U.S. PATENT DOCUMENTS

2023/0306791 A1* 9/2023 Lee .................. G06V 40/45

FOREIGN PATENT DOCUMENTS

| CN | 105225482 A | 1/2016 |
| CN | 106370671 A | 2/2017 |

(Continued)

OTHER PUBLICATIONS

Ruru Zhang et al., "Measuring Dimension of Parts of Binocular Vision Based on Halcon", Computer Measurement and Control, vol. 26, No. 01, Jan. 25, 2018, pp. 59-63.

*Primary Examiner* — Chan S Park
*Assistant Examiner* — Daniel C Chang

(57) ABSTRACT

The application relates to a polarity discrimination detection method and apparatus for multiple stacked electronic components and a device, and the method comprises the steps of: acquiring a collected image of a to-be-detected electronic component, and matching and positioning the collected image to obtain a positioning image; acquiring parameter data of a camera device, and carrying out stereo matching and image segmentation on the positioning image according to the parameter data to obtain three-dimensional coordinates; the to-be-detected electronic component to a polarity detection region through a manipulator according to the three-dimensional coordinates to acquire a detection image; analyzing the detection image to obtain polarity circle coordinates; and comparing the polarity circle coordinates with polarity circle standard coordinates arranged on the polarity detection region to obtain a polarity discrimination result.

7 Claims, 8 Drawing Sheets

(51) Int. Cl.
    *G06T 5/20*           (2006.01)
    *G06T 5/92*           (2024.01)
    *G06T 7/187*         (2017.01)
    *G06V 10/46*        (2022.01)
    *G06V 10/75*        (2022.01)

(52) U.S. Cl.
    CPC .............. *G06T 7/187* (2017.01); *G06V 10/46* (2022.01); *G06V 10/751* (2022.01)

(56) References Cited

FOREIGN PATENT DOCUMENTS

| | | | |
|---|---|---|---|
| CN | 109429473 A | * | 3/2019 |
| CN | 111488837 A | | 8/2020 |
| CN | 114255286 A | | 3/2022 |
| CN | 114494203 A | | 5/2022 |
| CN | 115082559 A | | 9/2022 |
| CN | 115439411 A | | 12/2022 |
| CN | 115526881 A | | 12/2022 |
| CN | 115561247 A | | 1/2023 |
| CN | 115760721 A | | 3/2023 |
| CN | 116612071 A | | 8/2023 |
| CN | 116958092 A | * | 10/2023 |
| CN | 116958092 A | | 10/2023 |

* cited by examiner

POLARITY DISCRIMINATION DETECTION METHOD AND APPARATUS FOR MULTIPLE STACKED ELECTRONIC COMPONENTS AND DEVICE

CROSS REFERENCE TO RELATED APPLICATIONS

This application claims foreign priority of Chinese Patent Application No. 202311475284.5, filed on Nov. 8, 2023 in the China National Intellectual Property Administration, the disclosures of all of which are hereby incorporated by reference.

TECHNICAL FIELD

The present application relates to the technical field of device detection, and particularly to a polarity discrimination detection method and apparatus for multiple stacked electronic components and a device.

BACKGROUND OF THE PRESENT INVENTION

The semiconductor industry belongs to the basic supporting industry of the national economy, and a testing and sorting device, as a functional testing device of IC components, is a core device in a semiconductor manufacturing process.

In recent years, an automatic loading and unloading technology of parts based on machine vision has been more and more widely used in a production process. A loading and unloading process realized by conventional visual positioning is mostly carried out in a two-dimensional aspect, and the loading and unloading process can be realized by setting a fixed lowering depth through a manipulator. However, in a sorting and testing process of the IC components, the IC components will be randomly placed in a material frame, multiple IC components may be overlapped and stacked, positions of the IC components in a depth direction cannot be detected by conventional two-dimensional vision, and the fixed lowering depth may cause the damage and deformation of the IC components or the damage of an end effector of the manipulator. Secondly, the IC components have the characteristics of diversity in packaging types and difference in shapes, traditional two-dimensional visual loading and unloading can only realize positioning and recognition for a single component, and different components need to be manually set with different lowering depths, so that the system has poor flexibility and limited expandability, which cannot meet the actual needs in the production process. Meanwhile, for some complex chips, a number of pins of the chip may be very large, and if one pin is incorrectly connected with other pins, a function of a whole circuit board will be invalid. In order to prevent an attached chip from being attached upside down, manufacturers will punch a small round hole next to a right angle of the chip as a sign of polarity when producing the chip. Therefore, in the production process of the IC components, the detection of a polarity circle position of the chip is a very important link, which can effectively ensure the quality and reliability of products and avoid unnecessary losses and risks.

SUMMARY OF THE PRESENT INVENTION

The present application provides a polarity discrimination detection method and apparatus for multiple stacked electronic components and a device for solving the technical problems that there is component stacking in existing polarity detection of IC components and grabbing by a manipulator at a fixed lowering depth may lead to component damage.

In order to achieve the above object, the present application provides the following technical solutions.

In one aspect, a polarity discrimination detection method for multiple stacked electronic components is provided, which comprises the following steps of:

acquiring a collected image of a to-be-detected electronic component, and matching and positioning the collected image to obtain a positioning image in which the to-be-detected electronic component is positioned;

acquiring parameter data of a camera device corresponding to the collected image, and carrying out stereo matching and image segmentation on the positioning image according to the parameter data to obtain three-dimensional coordinates of the to-be-detected electronic component;

moving the to-be-detected electronic component to a polarity detection region through a manipulator according to the three-dimensional coordinates to acquire a detection image of the to-be-detected electronic component;

analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component.

Preferably, the matching and positioning the collected image to obtain the positioning image in which the to-be-detected electronic component is positioned, comprises:

acquiring a template image of the electronic component, and preprocessing and rotating the template image to obtain a rotated template image;

binarizing and filtering the collected image to obtain a processed collected image; and constructing an image pyramid according to the processed collected image to obtain a to-be-searched image;

carrying out NCC matching on the to-be-searched image and the rotated template image by an NCC matching algorithm to obtain M matching values; and sorting the M matching values from largest to smallest, selecting pixel positions corresponding to the first N sorted matching values as N target to-be-detected electronic components for searching and positioning, and forming the N target to-be-detected electronic components into a two-dimensional positioning image.

Preferably, the carrying out stereo matching and image segmentation on the positioning image according to the parameter data to obtain the three-dimensional coordinates of the to-be-detected electronic component, comprises:

carrying out Gamma correction and filtering on the positioning image to obtain a preprocessed image;

carrying out stereo matching on the preprocessed image by an improved Census matching algorithm to obtain a disparity image;

carrying out image segmentation on the disparity image by a region growing segmentation algorithm based on disparity to obtain a segmented image; and acquiring coordinate data of the to-be-detected electronic component in the segmented image in a coordinate system of the camera device, and calculating according to the parameter data and the coordinate data to obtain the three-dimensional coordinates of the to-be-detected electronic component.

Preferably, the camera device is a binocular camera, and then two corresponding preprocessed images are obtained, and the carrying out stereo matching on the preprocessed image by the improved Census matching algorithm to obtain the disparity image, comprises:

dividing each preprocessed image into four sub-regions by a Census transform window to acquire a pixel uniformity of each sub-region;

calculating a gray value of a central pixel corresponding to each preprocessed image according to all pixel uniformities;

carrying out one-dimensional aggregation on each preprocessed image according to the gray value of the central pixel by a multipath cost aggregation algorithm to obtain two corresponding disparity-refined images; and according to a pixel distance difference between corresponding pixel points of the two disparity refinement maps, forming one of the pixel points corresponding to the pixel distance difference which meets a difference threshold into the disparity image.

Preferably, the calculating the three-dimensional coordinates of the to-be-detected electronic component according to the parameter data and the coordinate data, comprises:

calculating a disparity value of the to-be-detected electronic component by a disparity calculation formula according to the coordinate data and the parameter data; and calculating the three-dimensional coordinates of the to-be-detected electronic component by a coordinate calculation formula according to the parameter data, the disparity value and the coordinate data; wherein, the disparity calculation formula is:

$$d = f\frac{X}{Z} - f\frac{(X-B)}{Z}$$

the coordinate calculation formula is:

$$x = \frac{B*X}{d}$$
$$y = \frac{B*Y}{d}$$
$$z = \frac{B*f}{d}$$

wherein, d is the disparity value of the to-be-detected electronic component, f is a focal length of the parameter data, B is a baseline distance of the parameter data, X, Y and Z are the coordinate data of the to-be-detected electronic component on an X-axis, a Y-axis and a Z-axis in the coordinate system of the camera device, and x, y and z are the three-dimensional coordinates of the to-be-detected electronic component on the X-axis, the Y-axis and the Z-axis.

Preferably, the analyzing the detection image to obtain the polarity circle coordinates of the to-be-detected electronic component; and comparing the polarity circle coordinates with the polarity circle standard coordinates arranged on the polarity detection region to obtain the polarity discrimination result of the to-be-detected electronic component, comprises:

carrying out polarity circle positioning on the detection image by a contour search function of a contour detection algorithm to obtain a polarity circle;

determining a center of circle corresponding to the polarity circle through a plurality of circular boundary points of the polarity circle;

acquiring coordinates of the center of circle and taking the coordinates of the center of circle as the polarity circle coordinates; and when a difference between the polarity circle coordinates and the polarity circle standard coordinates meets a set difference value, taking the polarity discrimination result of the to-be-detected electronic component as a correct result; and when the difference between the polarity circle coordinates and the polarity circle standard coordinates does not meet the set difference value, taking the polarity discrimination result of the to-be-detected electronic component as a wrong result.

In another aspect, a polarity discrimination detection apparatus for multiple stacked electronic components is provided, which comprises a matching and positioning module, a matching and segmenting module, a moving and acquiring module, and a polarity discrimination module; wherein, the matching and positioning module is configured for acquiring a collected image of a to-be-detected electronic component, and matching and positioning the collected image to obtain a positioning image in which the to-be-detected electronic component is positioned;

the matching and segmenting module is configured for acquiring parameter data of a camera device corresponding to the collected image, and carrying out stereo matching and image segmentation on the positioning image according to the parameter data to obtain three-dimensional coordinates of the to-be-detected electronic component;

the moving and acquiring module is configured for moving the to-be-detected electronic component to a polarity detection region through a manipulator according to the three-dimensional coordinates to acquire a detection image of the to-be-detected electronic component; and the polarity discrimination module is configured for analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component.

Preferably, the matching and positioning module comprises a first processing submodule, a second processing submodule, a matching submodule and a positioning submodule;

the first processing submodule is configured for acquiring a template image of the electronic component, and preprocessing and rotating the template image to obtain a rotated template image;

the second processing submodule is configured for binarizing and filtering the collected image to obtain a processed collected image; and constructing an image pyramid according to the processed collected image to obtain a to-be-searched image;

the matching submodule is configured for carrying out NCC matching on the to-be-searched image and the rotated template image by an NCC matching algorithm to obtain M matching values; and the positioning submodule is configured for sorting the M matching values from largest to smallest, selecting pixel positions corresponding to the first N sorted matching values as N target to-be-detected electronic components for searching and positioning, and forming the N target to-be-detected electronic components into a two-dimensional positioning image.

Preferably, the matching and segmenting module comprises a third processing submodule, a stereo matching submodule, an image segmentation submodule and a coordinate calculation submodule;

the third processing submodule is configured for carrying out Gamma correction and filtering on the positioning image to obtain a preprocessed image;

the stereo matching submodule is configured for carrying out stereo matching on the preprocessed image by an improved Census matching algorithm to obtain a disparity image;

the image segmentation submodule is configured for carrying out image segmentation on the disparity image by a region growing segmentation algorithm based on disparity to obtain a segmented image; and the coordinate calculation submodule is configured for acquiring coordinate data of the to-be-detected electronic component in the segmented image in a coordinate system of the camera device, and calculating the three-dimensional coordinates of the to-be-detected electronic component according to the parameter data and the coordinate data.

In yet another aspect, an terminal device is provided, which comprises a processor and a storage; wherein, the storage is used for storing a program code and transmitting the program code to the processor; and the processor is used for executing the polarity discrimination detection method for the multiple stacked electronic components above based on an instruction in the program code.

According to the polarity discrimination detection method and apparatus for the multiple stacked electronic components and the device, the method comprises the steps of: acquiring the collected image of the to-be-detected electronic component, and matching and positioning the collected image to obtain the positioning image in which the to-be-detected electronic component is positioned; acquiring the parameter data of the camera device corresponding to the collected image, and carrying out stereo matching and image segmentation on the positioning image according to the parameter data to obtain the three-dimensional coordinates of the to-be-detected electronic component; moving the to-be-detected electronic component to the polarity detection region through the manipulator according to the three-dimensional coordinates to acquire the detection image of the to-be-detected electronic component; analyzing the detection image to obtain the polarity circle coordinates of the to-be-detected electronic component; and comparing the polarity circle coordinates with the polarity circle standard coordinates arranged on the polarity detection region to obtain the polarity discrimination result of the to-be-detected electronic component. It can be seen from the above technical solution that the embodiment of the present application has the following advantages: in the polarity discrimination detection method of the multiple stacked electronic components, the environment is sensed by a three-dimensional machine vision technology, and images of scattered, stacked and different to-be-detected electronic components are analyzed to obtain the three-dimensional coordinates of the to-be-detected electronic components; and then, the to-be-detected electronic components are moved to the polarity detection region through the manipulator according to the three-dimensional coordinates to collect the detection images, the detection images are analyzed to obtain the polarity circle coordinates, and the polarity circle coordinates are compared with the polarity circle standard coordinates to complete the polarity recognition of the components, thus solving the technical problems that there is component stacking in existing polarity detection of IC components and grabbing by the manipulator at a fixed lowering depth may lead to component damage.

DESCRIPTION OF THE DRAWINGS

In order to illustrate technical solutions in embodiments of the present application or the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

DETAILED DESCRIPTION OF PREFERRED EMBODIMENTS

In order to make the objects, features and advantages of the present application more obvious and easier to understand, technical solutions in embodiments of the present application are clearly and completely described hereinafter with reference to the drawings in the embodiments of the present application. Obviously, the embodiments described hereinafter are only some but not all of the embodiments of the present application. Based on the embodiments of the present application, all other embodiments obtained by those of ordinary skills in the art without going through any creative work should fall within the scope of protection of the present application.

In the descriptions of the embodiments of the present application, the terms "first" and "second" are only used for descriptive purposes, but cannot be understood as indicating or implying relative importance, or implicitly indicating the number of indicated technical features. Therefore, the feature defined by "first" and "second" may explicitly or implicitly include one or more of the features. In the descriptions of the embodiments of the present application, the meaning of "multiple" is two or more than two, unless otherwise specifically defined.

In the embodiments of the present application, the terms "installation", "connected", "connection", "fixation", and the like should be understood in broad sense unless otherwise specified and defined. For example, they may be fixed connection, removable connection or integrated connection; may be mechanical connection or electrical connection; and may be direct connection, or indirect connection through an Embodiment intermediate medium, and connection inside two components, or interaction relation of two elements. The specific meanings of the above terms in the embodiments of the present application may be understood in a specific case by those of ordinary skills in the art.

An embodiment of the present application provides a polarity discrimination detection method and apparatus for multiple stacked electronic components and a device for solving the technical problems that there is component stacking in existing polarity detection of IC components and grabbing by a manipulator at a fixed lowering depth may lead to component damage. In this embodiment, the polarity discrimination detection method and apparatus for the multiple stacked electronic components and the device may be applied to polarity detection of electronic components, and in this embodiment, IC components are taken as the electronic components for case illustration.

First Embodiment

Figure 1:
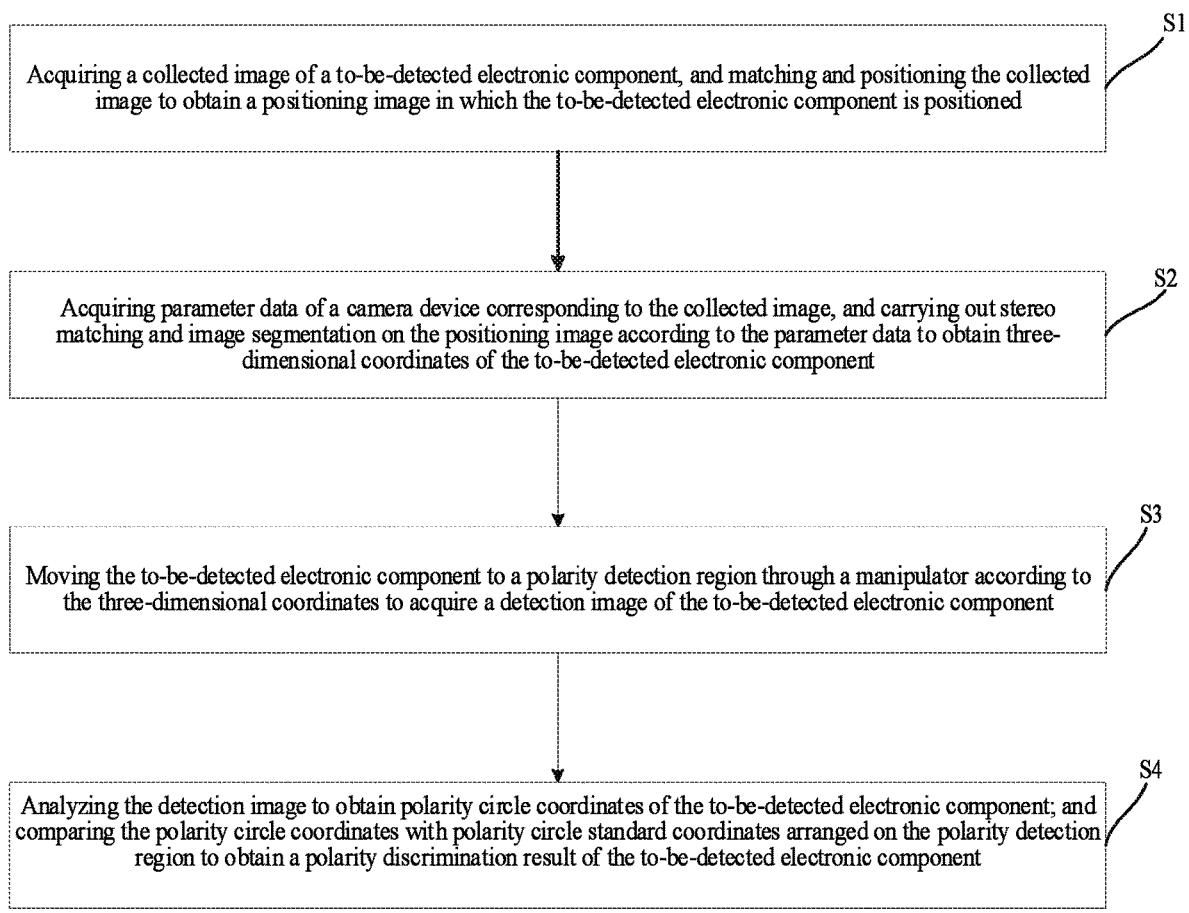
FIG. 1 is a step flow chart of a polarity discrimination detection method for multiple stacked electronic components according to an embodiment of the present application.
Figure 2:
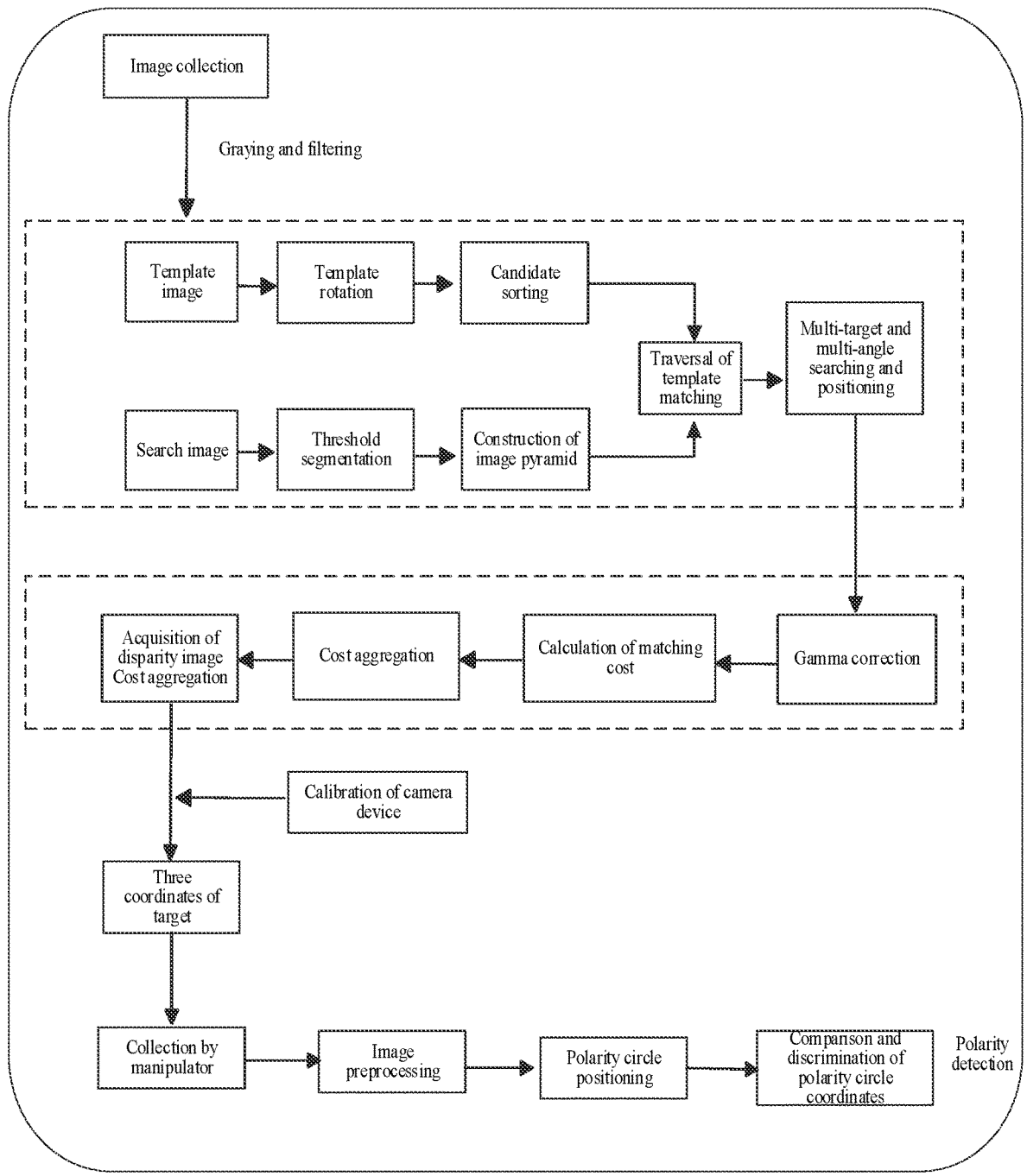
FIG. 2 is a frame flow chart of the polarity discrimination detection method for the multiple stacked electronic components according to the embodiment of the present application.
Figure 3:
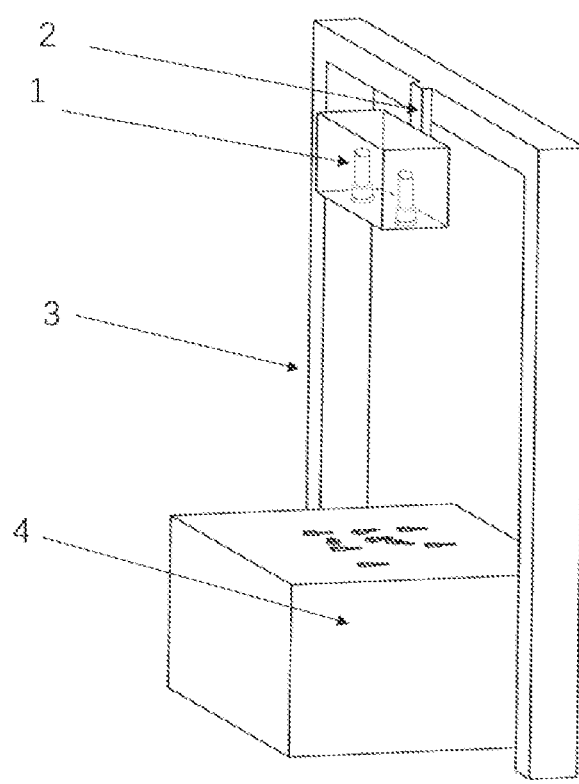
FIG. 3 is a schematic structural diagram of collection of an image by a camera device in the polarity discrimination detection method for the multiple stacked electronic components according to the embodiment of the present application.

FIG. 1 is a step flow chart of a polarity discrimination detection method for multiple stacked electronic components according to the embodiment of the present application, FIG. 2 is a frame flow chart of the polarity discrimination detection method for the multiple stacked electronic components according to the embodiment of the present application, and FIG. 3 is a schematic structural diagram of collection of an image by a camera device in the polarity discrimination detection method for the multiple stacked electronic components according to the embodiment of the present application.

As shown in FIG. 1 and FIG. 2, a polarity discrimination detection method for multiple stacked electronic components is provided by the embodiment of the present application, which comprises the following steps.

In S1, a collected image of a to-be-detected electronic component is acquired, and the collected image is matched and positioned to obtain a positioning image in which the to-be-detected electronic component is positioned.

It should be noted that, in the step S1, the collected image of the to-be-detected electronic component is acquired by a camera device, and then the collected image is processed to obtain the corresponding positioning image, which avoids the overlapping between the electronic components from shielding recognition and positioning. In this embodiment, the camera device may be a binocular camera, and then two corresponding collected images are obtained As shown in FIG. 3, in the embodiment of the present application, according to the polarity discrimination detection method for the multiple stacked electronic components, in the process of collecting the image of the to-be-detected electronic component by the camera device, the to-be-detected electronic component is placed in a test station 4, and the camera device 1 is arranged above the test station 4 through a supporting frame 3. In order to facilitate the collection of the image of the to-be-detected electronic component, the camera device 1 and the supporting frame 3 are connected through a distance adjusting slider 2.

In S2, parameter data of a camera device corresponding to the collected image are acquired, and stereo matching and image segmentation are carried out on the positioning image according to the parameter data to obtain three-dimensional coordinates of the to-be-detected electronic component.

It should be noted that, in the step S2, the parameter data of the camera device are acquired, and the parameter data comprise a focal length and a baseline distance of the image collected by the camera device. Then, the three-dimensional coordinates of the to-be-detected electronic component are calculated according to the parameter data in the process of carrying out stereo matching and image segmentation on the positioning image to solve the problem that depth information of the electronic components is unknown.

In S3, the to-be-detected electronic component is moved to a polarity detection region through a manipulator according to the three-dimensional coordinates to acquire a detection image of the to-be-detected electronic component.

It should be noted that, in the step S3, the three-dimensional coordinates of the position of the to-be-detected electronic component are obtained based on the step S2, the to-be-detected electronic component is grabbed from the test station by the manipulator according to the three-dimensional coordinates and moved to the polarity detection region, and then the detection image of the to-be-detected electronic component is acquired by a camera device of a single camera.

In S4, the detection image is analyzed to obtain polarity circle coordinates of the to-be-detected electronic component; and the polarity circle coordinates are compared with polarity circle standard coordinates arranged on the polarity detection region to obtain a polarity discrimination result of the to-be-detected electronic component.

It should be noted that, in the step S4, based on the detection image collected in the step S3, the detection image is analyzed to obtain the polarity circle coordinates of the to-be-detected electronic component, and then the polarity circle coordinates are compared with the polarity circle standard coordinates arranged on the polarity detection region itself to determine whether the polarity of the to-be-detected electronic component is correct or wrong. The polarity discrimination detection method for the multiple stacked electronic components can solve the problem that the electronic components are damaged due to manual polarity detection errors of the electronic components.

In the embodiment of the present application, according to the polarity discrimination detection method for the multiple stacked electronic components, the to-be-detected electronic component may be quickly searched, recognized and positioned from the multiple stacked electronic components, and the three-dimensional coordinates of the to-be-detected electronic component in a three-dimensional space are acquired to provide effective information for a subsequent loading and unloading process of the manipulator. After completing loading and unloading, the polarity recognition detection of the to-be-detected electronic component is carried out, which prevents the problem of component damage caused by wrong polarity direction discrimination to lead to batch damage.

According to the polarity discrimination detection method for the multiple stacked electronic components provided by the present application, the method comprises the steps of: acquiring the collected image of the to-be-detected electronic component, and matching and positioning the collected image to obtain the positioning image in which the to-be-detected electronic component is positioned; acquiring the parameter data of the camera device corresponding to the collected image, and carrying out stereo matching and image segmentation on the positioning image according to the parameter data to obtain the three-dimensional coordinates of the to-be-detected electronic component; moving the to-be-detected electronic component to the polarity detection region through the manipulator according to the three-dimensional coordinates to acquire the detection image of the to-be-detected electronic component; analyzing the detection image to obtain the polarity circle coordinates of the to-be-detected electronic component; and comparing the polarity circle coordinates with the polarity circle standard coordinates arranged on the polarity detection region to obtain the polarity discrimination result of the to-be-detected electronic component. In the polarity discrimination detection method of the multiple stacked electronic components, the environment is sensed by a three-dimensional machine vision technology, and images of scattered, stacked and different to-be-detected electronic components are analyzed to obtain the three-dimensional coordinates of the to-be-detected electronic components; and then, the to-be-detected electronic components are moved to the polarity detection region through the manipulator according to the three-dimensional coordinates to collect the detection images, the detection images are analyzed to obtain the polarity circle coordinates, and the polarity circle coordinates are compared with the polarity circle standard coordinates to complete the polarity recognition of the components, thus solving the technical problems that there is component stacking in existing polarity detection of IC components and grabbing by the manipulator at a fixed lowering depth may lead to component damage.

Figure 4:
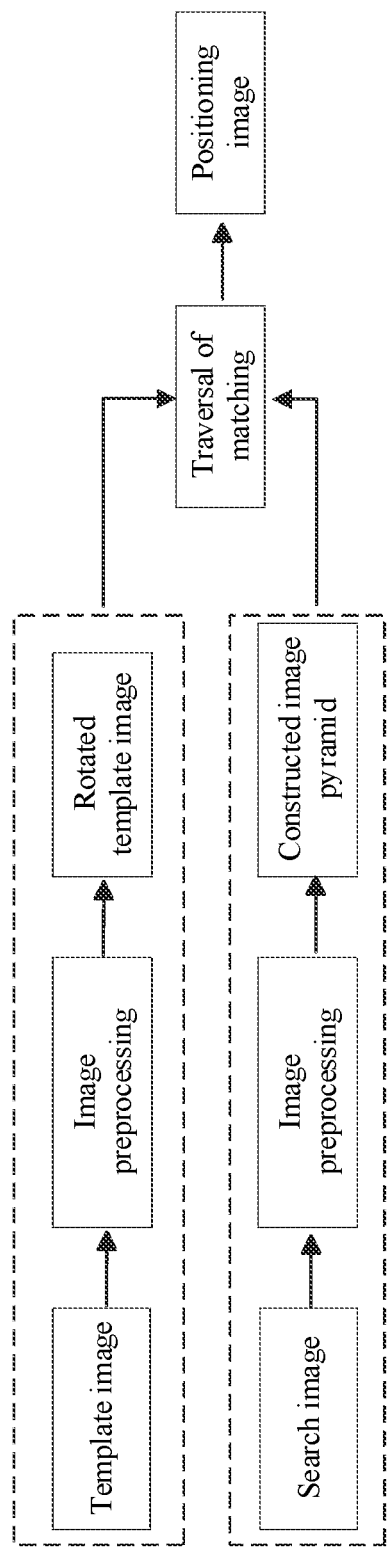
FIG. 4 is a frame flow chart of acquisition of a positioning image in the polarity discrimination detection method for the multiple stacked electronic components according to the embodiment of the present application.

FIG. 4 is a frame flow chart of acquisition of the positioning image in the polarity discrimination detection method for the multiple stacked electronic components according to the embodiment of the present application.

As shown in FIG. 4, in one embodiment of the present application, the matching and positioning the collected image to obtain the positioning image in which the to-be-detected electronic component is positioned, comprises:

acquiring a template image of the electronic component, and preprocessing and rotating the template image to obtain a rotated template image;

binarizing and filtering the collected image to obtain a processed collected image; and constructing an image pyramid according to the processed collected image to obtain a to-be-searched image;

carrying out NCC matching on the to-be-searched image and the rotated template image by an NCC matching algorithm to obtain M matching values; and sorting the M matching values from largest to smallest, selecting pixel positions corresponding to the first N sorted matching values as N target to-be-detected electronic components for searching and positioning, and forming the N target to-be-detected electronic components into a two-dimensional positioning image, wherein N is a natural number greater than 0, and N is less than M.

It should be noted that, in the process of polarity detection of the produced electronic components, most electronic components are randomly stacked in a material frame, there are shielding and overlapping situations between the electronic components, and meanwhile, the electronic components have the characteristics of complex structure and small size. Therefore, a fast searching and positioning method is needed to find the to-be-detected electronic component which needs to be grabbed. In the polarity discrimination detection method of the multiple stacked electronic components, an improved NCC-based matching algorithm is adopted, as shown in FIG. 4. The collected image is obtained by the camera device first, image preprocessing works such as binarization, filtering, and opening and closing operation are carried out on the collected image, and the processed image is constructed into the image pyramid to obtain the to-be-searched image. Then, the template image is acquired. After the template image is binarized and filtered, the template image is rotated, and the rotated template image is used to realize multi-angle searching and positioning in the to-be-searched image. The image pyramid is used for carrying out down-sampling on the to-be-searched image to increase a calculation speed for full image matching to obtain the M matching values, the M matching values are sorted from largest to smallest, the first N maximum matching values are selected as candidate points to search and position multiple target to-be-detected electronic components, and the image in which the N target to-be-detected electronic components are located is formed into the two-dimensional positioning image. The NCC matching algorithm can realize multi-target and multi-angle template matching, positioning and recognition, and can realize the searching and positioning of the electronic components randomly placed in the material frame, and the image pyramid is used to increase a searching speed to meet an actual production requirement. In this embodiment, the NCC is an existing algorithm for calculating a correlation between two sets of sample data based on statistics, which is used for comparing a similarity between the template image and the to-be-searched image. The similarity may be obtained by the NCC matching, and the similarity is expressed by a numerical size, which is the matching value. The matching value is obtained by convolution calculation in a matching process. The matching value is obtained by measuring the similarity between the template image and the to-be-searched image, the first N maximum values are selected as the candidate points, which means that N places similar to the template image are found in the to-be-searched image, that is to say, many electronic components similar to the template image are found in the to-be-searched image, and pixel positions of centroids of these electronic components are positions of the electronic components, thus providing a basis for subsequent calculation of the three-dimensional coordinates of the electronic components.

Figure 5:
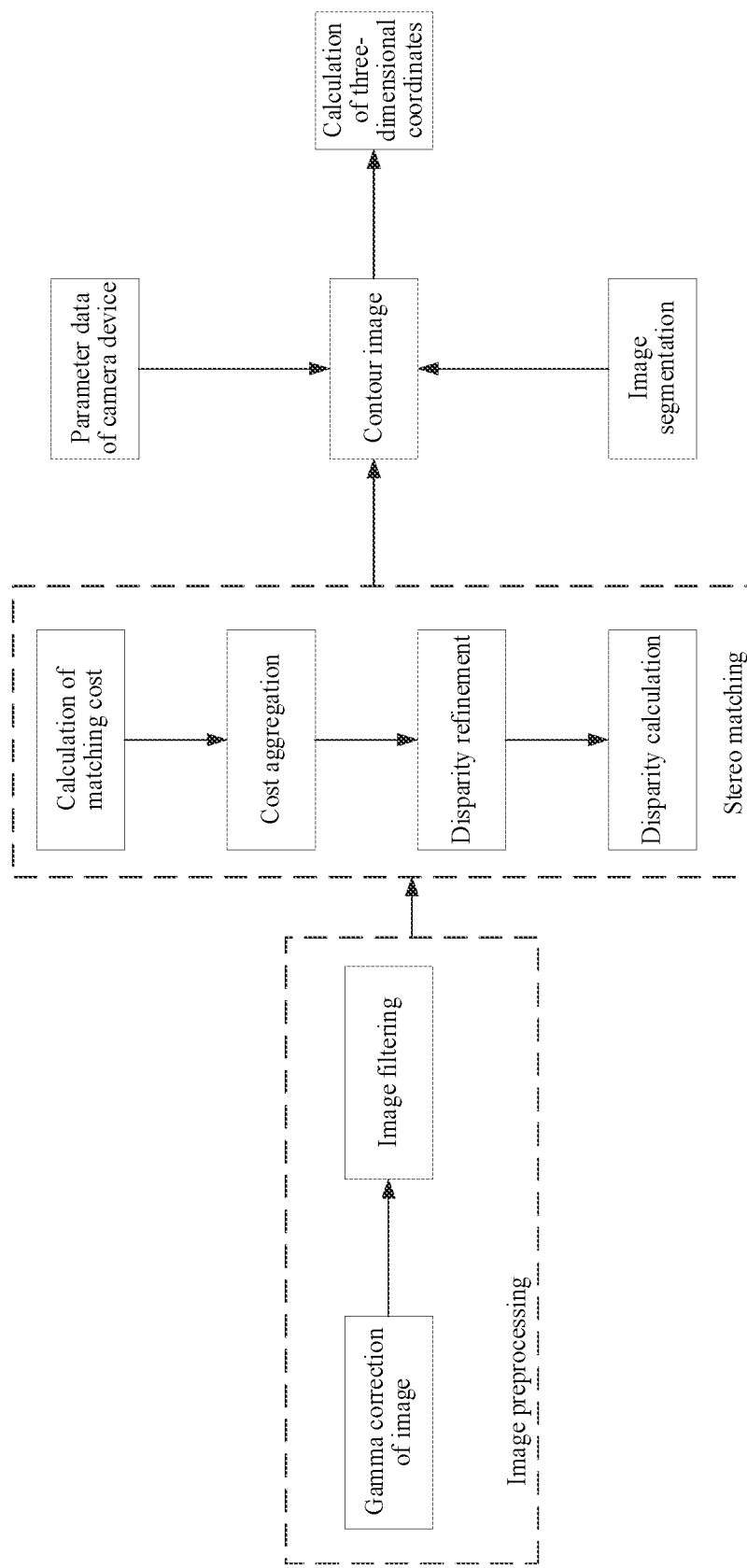
FIG. 5 is a frame flow chart of calculation of three-dimensional coordinates in the polarity discrimination detection method for the multiple stacked electronic components according to the embodiment of the present application.
Figure 6:
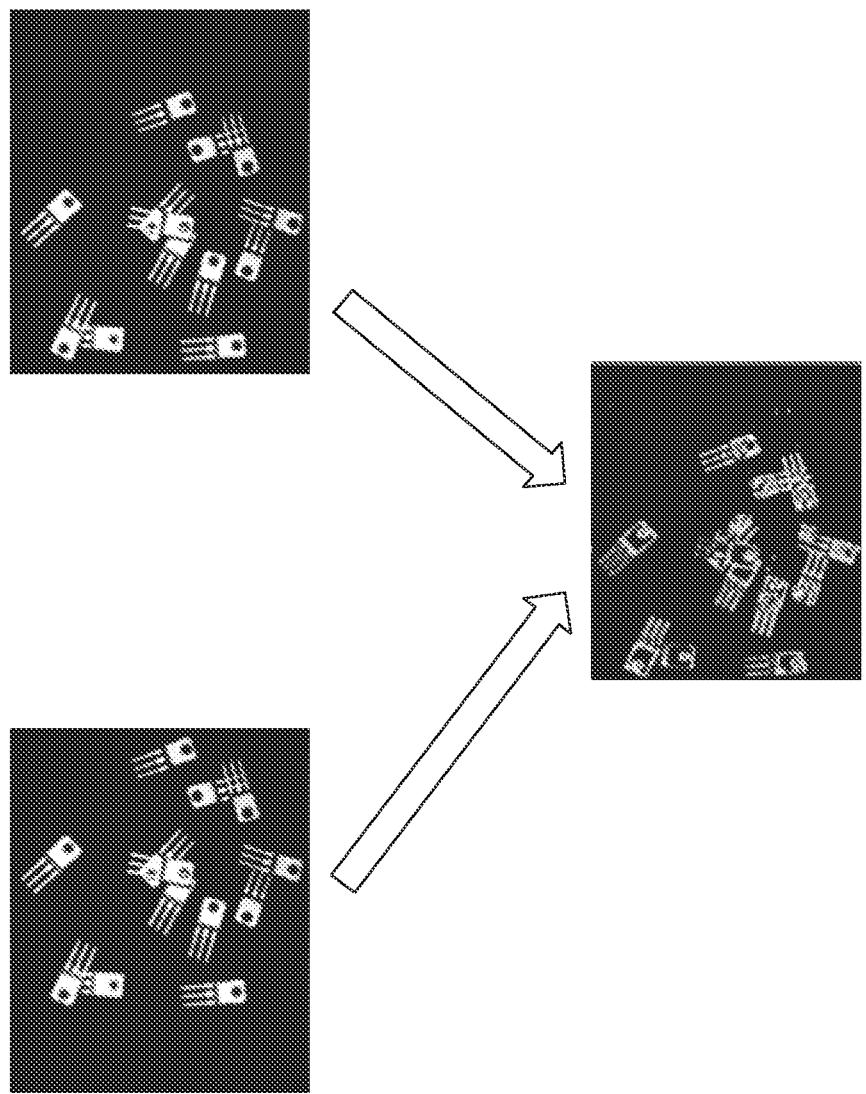
FIG. 6 is a schematic diagram of a disparity image in the polarity discrimination detection method for the multiple stacked electronic components according to the embodiment of the present application.

FIG. 5 is a frame flow chart of calculation of the three-dimensional coordinates in the polarity discrimination detection method for the multiple stacked electronic components according to the embodiment of the present application, and FIG. 6 is a schematic diagram of the disparity image in the polarity discrimination detection method for the multiple stacked electronic components according to the embodiment of the present application.

As shown in FIG. 5, in one embodiment of the present application, the carrying out stereo matching and image segmentation on the positioning image according to the parameter data to obtain the three-dimensional coordinates of the to-be-detected electronic component, comprises:

carrying out Gamma correction and filtering on the positioning image to obtain a preprocessed image;

carrying out stereo matching on the preprocessed image by an improved Census matching algorithm to obtain a disparity image;

carrying out image segmentation on the disparity image by a region growing segmentation algorithm based on disparity to obtain a segmented image; and acquiring coordinate data of the to-be-detected electronic component in the segmented image in a coordinate system of the camera device, and calculating according to the parameter data and the coordinate data to obtain the three-dimensional coordinates of the to-be-detected electronic component.

It should be noted that, according to the polarity discrimination detection method for the multiple stacked electronic components, after the positioning image is obtained by the step S2, the positions of the electronic components in a depth direction are not clear in a scene where the electronic components are stacked. In addition, there are many types of electronic components, and the grabbing of the electronic components by the manipulator at a fixed lowering depth may cause damage of the electronic components or damage of an end effector of the manipulator. Therefore, according to the polarity discrimination detection method for the multiple stacked electronic components, the improved Census matching algorithm and the region growing segmentation algorithm based on disparity are adopted, so that the depth information of the to-be-detected electronic component in the real world may be acquired, and different lowering depths of the manipulator may be set in real time according to different situations, thus having high expandability. In this embodiment, according to the polarity discrimination detection method for the multiple stacked electronic components, firstly, the camera device, which is namely the binocular camera, is calibrated to acquire the parameter data inside and outside the camera device, so that necessary information is provided for a subsequent stereo work. As shown in FIG. 5, the positioning image is preprocessed to obtain the preprocessed image, and left and right planes are coplanar through image correction. Secondly, the improved Census matching algorithm is used to carry out stereo matching on the preprocessed image, and wrong disparity in the image needs to be removed and corrected to obtain a correct disparity image. Finally, the disparity image is segmented and calculated first to obtain the three-dimensional coordinates of the to-be-detected electronic component, so as to determine the depth information of the to-be-detected electronic component.

In the embodiment of the present application, if the images collected by the binocular camera are recorded as a left image and a right image respectively, to make planes of the left and right images coplanar, corresponding points on the left and right images are located on the same horizontal line, thus increasing a stereo matching speed. The filtering comprises: smoothing the image and removing redundant noise of the image to make the image clearer and smoother, thus increasing the matching speed.

In the embodiment of the present application, the camera device is the binocular camera, and then two corresponding preprocessed images are obtained. The carrying out stereo matching on the preprocessed image by the improved Census matching algorithm to obtain the disparity image, comprises:

dividing each preprocessed image into four sub-regions by a Census transform window to acquire a pixel uniformity of each sub-region;

calculating a gray value of a central pixel corresponding to each preprocessed image according to all pixel uniformities;

carrying out one-dimensional aggregation on each preprocessed image according to the gray value of the central pixel by a multipath cost aggregation algorithm to obtain two corresponding disparity-refined images; and according to a pixel distance difference between corresponding pixel points of the two disparity refinement maps, forming one of the pixel points corresponding to the pixel distance difference which meets a difference threshold into the disparity image. The difference threshold may be set according to a demand, which is not specifically limited.

It should be noted that, the left and right preprocessed images are evenly divided into the four sub-regions by the Census transform window, and the pixel uniformity of each sub-region is calculated by a uniformity calculation formula. The uniformity calculation formula is:

$$Q_j = \sum_{i=1}^{6} G_i + \overline{G}_j$$

wherein, $Q_j$ is a pixel uniformity of a j-th sub-region, $G_i$ is a gray value of an i-th pixel in the j-th sub-region, and $\overline{G}_j$ is an average gray value of all pixels in the j-th sub-region. By comparing uniformities of different sub-regions, according to the polarity discrimination detection method for the multiple stacked electronic components, two sub-regions with a maximum uniformity and a minimum uniformity are selected to calculate the gray value of the central pixel of each preprocessed image. The calculating the gray value of the central pixel corresponding to each preprocessed image, comprises:

selecting two sub-regions corresponding to a maximum pixel uniformity and a minimum pixel uniformity from all pixel uniformities;

when a difference between average gray values of the two sub-regions is less than or equal to a gray threshold $\alpha$, taking the average gray values of the two sub-regions as the gray value of the central pixel; and when the difference between the average gray values of the two sub-regions is greater than the gray threshold $\alpha$, selecting a gray median of the sub-region corresponding to the maximum pixel uniformity and the average gray value of the sub-region corresponding to the minimum pixel uniformity for weighted average, and taking a weighted average value as the gray value of the central pixel. In this embodiment, when the gray threshold $\alpha$ is 15, a calculation formula of the gray value of the central pixel may be expressed as:

$$G_{new} = \begin{cases} \dfrac{\dfrac{G_3 + G_4}{2} + G_{min}}{2} \\ \dfrac{G_{max} + G_{min}}{2}, G_{max} - G_{min} \leq \alpha, G_{max} - G_{min} > \alpha \end{cases} ;$$

wherein, $G_{new}$ is the gray value of the central pixel, and $G_{max}$ and $G_{min}$ are average gray values of pixels of the sub-regions corresponding to the maximum pixel uniformity and the minimum pixel uniformity respectively; and $G_3$ and $G_4$ are the gray values sorted from largest to smallest of the sub-region corresponding to the largest pixel uniformity.

In the embodiment of the present application, one-dimensional aggregation is carried out on a pixel matching cost value in a disparity range by the multipath cost aggregation algorithm to calculate a cost value of each path under this pixel, and the cost values of all paths are accumulated to obtain left and right disparity-refined images. When a cost function of traversing all pixels p with disparity d along a certain path t is:

$$I_t(p, d) = C(p, d) + \min \begin{Bmatrix} I_t(p-r, d) \\ I_t(p-r, d-1) + P_1 \\ I_t(p-r, d+1) + P_1 \\ \min(I_t(p-r, d-1)) + P_2 \end{Bmatrix} - \min(I_t(p-r, l))$$

wherein, $I_t(p-r, d)$ is a cost value of a previous pixel which is d in the path, $I_t(p-r, d-1)$ is a cost value of a previous pixel which is d−1 in the path, $I_t(p-r, d+1)$ is a cost value of a previous pixel which is d+1 in the path, $\min(I_t(p-r, d-1))$ is a minimum value of all costs of the previous pixel in the path, and P1 and P2 are both penalty terms, which are generally set voluntarily, wherein P2 is much greater than P1. The disparity d refers to a process of stereo matching, that is, a distance difference between corresponding pixels of the same space point on the left and right images is obtained by comparing the left and right images, which is namely the disparity.

It should be noted that, when the disparity is calculated on the left and right disparity-refined images, if it is found that a difference between a disparity value of a certain point in the left disparity-refined image and a disparity value of a corresponding point in the right disparity-refined image is greater than the difference threshold, then this point is eliminated. In order to fill the void, the eliminated void point will be given the smaller one of disparity values of adjacent left and right non-void points. Finally, median filtering is used to smooth the image subjected to disparity screening to obtain a clearer and more accurate disparity image, as shown in FIG. 6. According to the polarity discrimination detection method for the multiple stacked electronic components, the disparity image can be accurately reconstructed, a good matching performance in an internal region is achieved, and an internal structure of a component can be clearly observed. A good performance in weak-texture and reflective regions is achieved, certain robustness is provided, and the component can be distinguished from a background region, and there are only a few of disparity voids.

Figure 7:
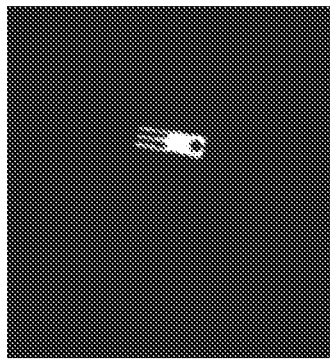
FIG. 7 is a schematic diagram of segmentation of a region growing image in the polarity discrimination detection method for the multiple stacked electronic components according to the embodiment of the present application.
Figure 7:
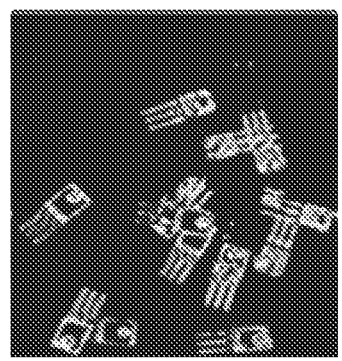

FIG. 7 is a schematic diagram of segmentation of a region growing image in the polarity discrimination detection method for the multiple stacked electronic components according to the embodiment of the present application.

In the embodiment of the present application, the carrying out image segmentation on the disparity image by the region growing segmentation algorithm based on disparity to obtain the segmented image, comprises:

determining the to-be-detected electronic component from the disparity image and taking the to-be-detected electronic component as an initial seed point;

searching around from the maximum disparity of the disparity image according to the initial seed point and a set region growing rule, when a pixel gray value of a certain point on the disparity image is less than a set threshold and a disparity variation is within a set range, regarding the point as meeting the condition and taking the point as a new initial seed point for region growing, and searching again until no adjacent pixels meet the condition that the pixel gray value is less than the set threshold, so as to obtain the segmented image of the to-be-detected electronic component which needs to be grabbed; and judging whether the segmented image is a complete workpiece shape of the to-be-detected electronic component by a Canny edge detection operator.

It should be noted that, starting from a rule of collecting a material by the manipulator, the collection by the manipulator is carried out according to a rule of starting from a top layer workpiece, because the most complete information may be obtained in this way. After the initial seed point is determined by the region growing segmentation algorithm based on disparity, a region of interest (a region in which the to-be-detected electronic component is located) may be segmented. A to-be-segmented target is judged through the depth information, and the depth information is determined through disparity, so that the larger the disparity, the smaller the distance between the component and the camera device, and the closer the component is to the upper layer. Based on the above principle, the disparity image is segmented, and a to-be-grabbed workpiece is segmented, thus achieving the purpose of image segmentation. Then, the position (such as the three-dimensional coordinates) of the to-be-detected electronic component in the coordinate system of the camera device may be acquired through internal and external parameters of the binocular camera obtained above. In order to solve the problem of neighborhood pixel voids appearing in the disparity image, image dilation is carried out on the disparity image. In the case of searching around from a place with the maximum disparity, when this point meets the condition (the condition is that the pixel gray value of the certain point in the disparity image is less than the set threshold), the point may serve as the new initial seed point for region growing. After the segmentation is completed, the integrity of an image segmentation region is judged, and finally, the to-be-detected electronic component is segmented to obtain the segmented image, thus achieving the purpose of image segmentation. As shown in FIG. 7, by processing the image, a threshold of the initial seed point for searching is set as 60, an allowable variation range of the disparity is set to be less than 4, and an allowable set threshold of the difference between the gray values in the region growing process is set as 3. In this embodiment, the image segmentation comprises: determining the to-be-detected electronic component which needs to be grabbed in the disparity image first, and selecting one seed point as the starting point; and then judging whether surrounding pixels meet the condition in adjacent regions of the initial seed point according to the preset region growing rule. When the pixels meet the condition, these pixels are merged into the region in which the seed point is located to be used as the new initial seed point. Then, whether surrounding pixels of the new initial seed point meet the condition is judged again, and this process is repeated until no adjacent pixels meet the condition, so that the image segmentation can be completed, and the segmented image of the to-be-detected electronic component which needs to be grabbed is successfully extracted. The integrity judgment comprises judging whether the segmented image is the complete workpiece shape of the to-be-detected electronic component by the Canny edge detection operator.

In the embodiment of the present application, the calculating the three-dimensional coordinates of the to-be-detected electronic component according to the parameter data and the coordinate data, comprises:

calculating a disparity value of the to-be-detected electronic component by a disparity calculation formula according to the coordinate data and the parameter data; and calculating the three-dimensional coordinates of the to-be-detected electronic component by a coordinate calculation formula according to the parameter data, the disparity value and the coordinate data; wherein, the disparity calculation formula is:

$$d = f\frac{X}{Z} - f\frac{(X-B)}{Z}$$

the coordinate calculation formula is:

$$x = \frac{B*X}{d}$$
$$y = \frac{B*Y}{d}$$
$$z = \frac{B*f}{d}$$

wherein, d is the disparity value of the to-be-detected electronic component, f is a focal length of the parameter data, B is a baseline distance of the parameter data, X, Y and Z are the coordinate data of the to-be-detected electronic component on an X-axis, a Y-axis and a Z-axis in the coordinate system of the camera device, and x, y and z are the three-dimensional coordinates of the to-be-detected electronic component on the X-axis, the Y-axis and the Z-axis.

It should be noted that, according to a binocular vision principle, a re-projection matrix of the camera device, which is namely the binocular camera, is solved as follows:

$$Q = \begin{bmatrix} 1 & 0 & 0 & -C_x \\ 0 & 0 & 0 & -C_y \\ 0 & 0 & 0 & f \\ 0 & 0 & -\frac{1}{B} & 0 \end{bmatrix}$$

wherein, $C_x$ and $C_y$ are respectively vertical and horizontal coordinates of a main point of the left camera in the segmented image. A transformation relationship between the coordinate system of the camera device and the coordinate system of the image may be obtained through the re-projection matrix as follows:

$$\begin{bmatrix} X \\ Y \\ Z \\ W \end{bmatrix} = Q \begin{bmatrix} x \\ y \\ d \\ 1 \end{bmatrix}$$

wherein, W is a weight in a homogeneous coordinate system, which is usually equal to 1. Two images of the same to-be-detected electronic component are shot by two cameras to obtain two-dimensional projection images of the to-be-detected electronic component from two viewpoints. The disparity method (that is, a distance difference between the same object seen from the two viewpoints) or the disparity calculation formula is used to calculate the disparity value of the to-be-detected electronic component under the two viewpoints. The calculated three-dimensional coordinates of the to-be-detected electronic component facilitate subsequent obtaining of coordinates of a center of circle and a normal vector of the to-be-detected electronic component. According to the polarity discrimination detection method for the multiple stacked electronic components, a three-dimensional pose of the to-be-detected electronic component capable of being positioned and grabbed may be obtained by hand-eye relationship conversion according to the three-dimensional coordinates of the to-be-detected electronic component. The homogeneous coordinate system is an expanded coordinate system for representing a point and a vector, which allows translation and projection operations to be uniformly expressed as matrix multiplication. In most cases, the value of the weight "w" is equal to 1.

Figure 8:
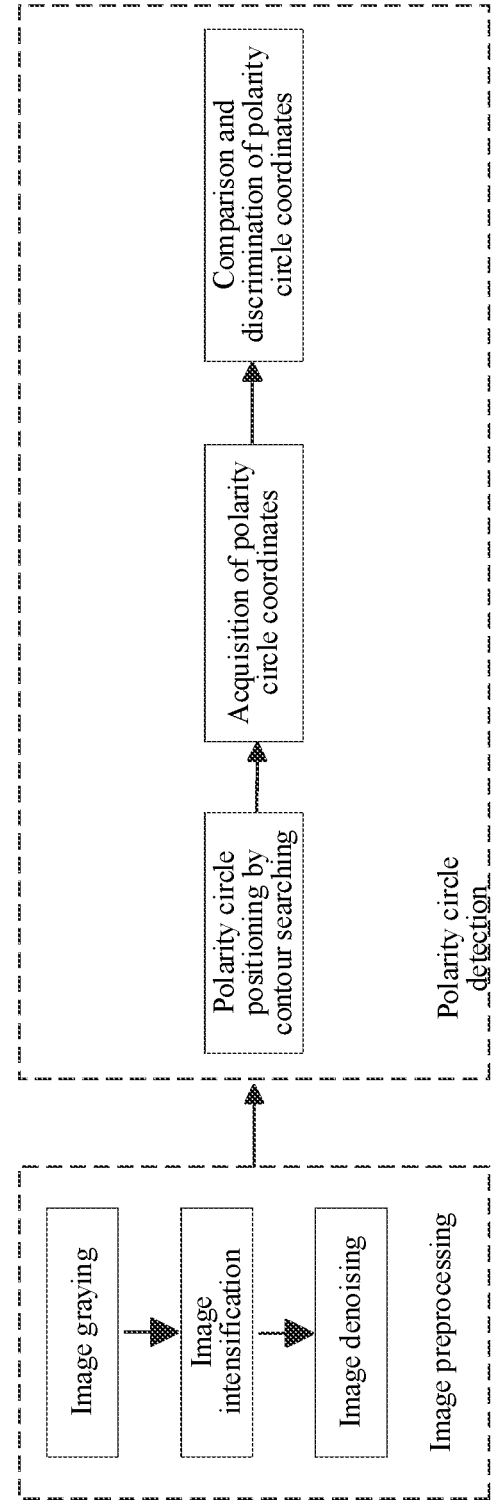
FIG. 8 is a frame diagram of polarity detection in the polarity discrimination detection method for the multiple stacked electronic components according to the embodiment of the present application.

FIG. 8 is a frame diagram of polarity detection in the polarity discrimination detection method for the multiple stacked electronic components according to the embodiment of the present application.

In one embodiment of the present application, the analyzing the detection image to obtain the polarity circle coordinates of the to-be-detected electronic component; and comparing the polarity circle coordinates with the polarity circle standard coordinates arranged on the polarity detection region to obtain the polarity discrimination result of the to-be-detected electronic component, comprises:

carrying out polarity circle positioning on the detection image by a contour search function of a contour detection algorithm to obtain a polarity circle;

determining a center of circle corresponding to the polarity circle through a plurality of circular boundary points of the polarity circle;

acquiring coordinates of the center of circle and taking the coordinates of the center of circle as the polarity circle coordinates; and when a difference between the polarity circle coordinates and the polarity circle standard coordinates meets a set difference value, taking the polarity discrimination result of the to-be-detected electronic component as a correct result; and when the difference between the polarity circle coordinates and the polarity circle standard coordinates does not meet the set difference value, taking the polarity discrimination result of the to-be-detected electronic component as a wrong result.

It should be noted that the polarity detection is carried out on the to-be-detected electronic component. A detection flow is as shown in FIG. 8. According to the polarity discrimination detection method for the multiple stacked electronic components, graying, and image intensification and denoising are further carried out on the detection image, and then polarity circle positioning and polarity circle center comparison detection are carried out. The image preprocessing reduces an amount of image data by graying and ROI interception, ensures no missing of features, and improves a processing speed and detection accuracy. The contour detection algorithm is used to carry out the polarity circle detection on the to-be-detected electronic component in the preprocessed detection image, and the contour search function is used to carry out the polarity circle positioning. The polarity circle positioning specifically comprises positioning the polarity circle by finding a circumscribed rectangle of the polarity circle, and when a length-width ratio of the circumscribed rectangle is close to 1, that is, the circumscribed rectangle is approximately a square, judging the circle as the polarity circle. After the polarity circle is positioned, the coordinates of the center of circle need to be calculated. A calculation process of the coordinates of the center of circle is as follows: there are many points on the boundary of the detected polarity circle, each point corresponds to one circle at the same time, the circles corresponding to all points may intersect at one point, and this intersection point is the center of circle. The coordinates of the center of circle of the corresponding circle, which are namely the polarity circle coordinates, may be obtained by the contour detection function. Then, when the difference between the polarity circle coordinates and the polarity circle standard coordinates meets the set difference value, the polarity of the to-be-detected electronic component may be effectively detected, which prevents the problems such as the damage of the electronic components caused by misjudgment, thus ensuring the production quality and the smooth progress of mass production. In this embodiment, the set difference value may be set according to a demand, which is not specifically limited herein.

Second Embodiment

Figure 9:
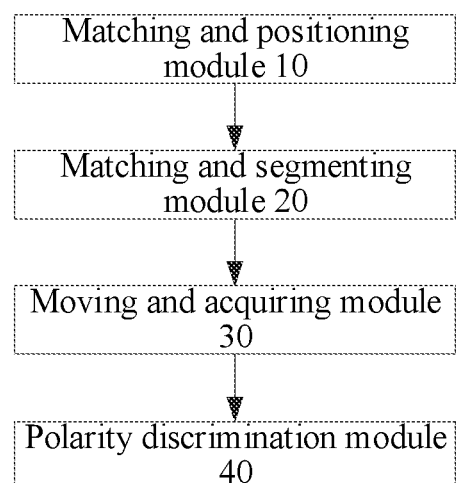
FIG. 9 is a frame flow chart of a polarity discrimination detection apparatus for multiple stacked electronic components according to an embodiment of the present application.

FIG. 9 is a frame flow chart of a polarity discrimination detection apparatus for multiple stacked electronic components according to an embodiment of the present application.

As shown in FIG. 9, the embodiment of the present application provides a polarity discrimination detection apparatus for multiple stacked electronic components, which comprises a matching and positioning module 10, a matching and segmenting module 20, a moving and acquiring module 30, and a polarity discrimination module 40; wherein,
  the matching and positioning module 10 is configured for acquiring a collected image of a to-be-detected electronic component, and matching and positioning the collected image to obtain a positioning image in which the to-be-detected electronic component is positioned;
  the matching and segmenting module 20 is configured for acquiring parameter data of a camera device corresponding to the collected image, and carrying out stereo matching and image segmentation on the positioning image according to the parameter data to obtain three-dimensional coordinates of the to-be-detected electronic component;
  the moving and acquiring module 30 is configured for moving the to-be-detected electronic component to a polarity detection region through a manipulator according to the three-dimensional coordinates to acquire a detection image of the to-be-detected electronic component; and
  the polarity discrimination module 40 is configured for analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component.

In the embodiment of the present application, the matching and positioning module 10 comprises a first processing submodule, a second processing submodule, a matching submodule and a positioning submodule; wherein,
  the first processing submodule is configured for acquiring a template image of the electronic component, and preprocessing and rotating the template image to obtain a rotated template image;
  the second processing submodule is configured for binarizing and filtering the collected image to obtain a processed collected image; and constructing an image pyramid according to the processed collected image to obtain a to-be-searched image;
  the matching submodule is configured for carrying out NCC matching on the to-be-searched image and the rotated template image by an NCC matching algorithm to obtain M matching values; and
  the positioning submodule is configured for sorting the M matching values from largest to smallest, selecting pixel positions corresponding to the first N sorted matching values as N target to-be-detected electronic components for searching and positioning, and forming the N target to-be-detected electronic components into a two-dimensional positioning image.

In the embodiment of the present application, the matching and segmenting module 20 comprises a third processing submodule, a stereo matching submodule, an image segmentation submodule and a coordinate calculation submodule; wherein,
  the third processing submodule is configured for carrying out Gamma correction and filtering on the positioning image to obtain a preprocessed image;
  the stereo matching submodule is configured for carrying out stereo matching on the preprocessed image by an improved Census matching algorithm to obtain a disparity image;
  the image segmentation submodule is configured for carrying out image segmentation on the disparity image by a region growing segmentation algorithm based on disparity to obtain a segmented image; and
  the coordinate calculation submodule is configured for acquiring coordinate data of the to-be-detected electronic component in the segmented image in a coordinate system of the camera device, and calculating the three-dimensional coordinates of the to-be-detected electronic component according to the parameter data and the coordinate data.

It should be noted that the modules in the apparatus of Second Embodiment correspond to the steps in the method of First Embodiment, and the contents of the polarity discrimination detection method for the multiple stacked electronic components have been described in detail in First Embodiment, so that the contents of the modules in the apparatus are no longer described in detail in Second Embodiment.

Third Embodiment

The embodiment of the present application provides an terminal device, which comprises a processor and a storage; wherein, the storage is used for storing a program code and transmitting the program code to the processor; and the processor is used for executing the polarity discrimination detection method for the multiple stacked electronic components above based on an instruction in the program code.

It should be noted that the processor is used for executing the steps in the embodiment of the polarity discrimination detection method for the multiple stacked electronic components above based on the instruction in the program code. Alternatively, functions of various modules/units in various system/apparatus embodiments above are realized when the processor executes the computer program.

Illustratively, the computer program may be divided into one or more modules/units, and the one or more modules/units are stored in the storage and executed by the processor to complete the present application. The one or more modules/units may be a series of computer program instruction segments capable of completing specific functions, and the instruction segments are used to describe an execution process of the computer program in the terminal device.

The terminal device may be a computing device, such as a desktop computer, a laptop computer, a palmtop computer and a cloud server. The terminal device comprises, but is not limited to, the processor and the storage. Those skilled in the art may understand that the processor and the storage do not constitute a limitation on the terminal device, and the terminal device may comprise more or less components than those shown in the drawings, or a combination of some components, or different components. For example, the terminal device may also comprise input and output devices, a network access device, a bus, and the like.

The processor may be a Central Processing Unit (CPU), and may also be other general processors, Digital Signal Processors (DSP), Application Specific Integrated Circuits (ASIC) and Field-Programmable Gate Arrays (FPGA), or other programmable logic devices, discrete gate or transistor logic devices, discrete hardware assemblies, and the like. The general processor may be a microprocessor or the processor may also be any conventional processor, and the like.

The storage may be an internal storage unit of the terminal device, such as a hard disk or a memory of the terminal device. The storage may also be an external storage device of the terminal device, such as a plug-in hard disk, a Smart Media Card (SMC), a Secure Digital (SD) card and a Flash Card arranged on the terminal device. Further, the storage may further comprise both the internal storage unit and the external storage device of the terminal device. The storage is used for storing the computer program and other programs and data required by the terminal device. The storage may also be used for temporarily storing data that have been output or will be output.

It can be clearly understood by those skilled in the art that, for the sake of convenience and brevity in description, a detailed working process of the foregoing system, apparatus and unit may refer to a corresponding process in the foregoing method embodiment, which will not be repeated herein.

In the several embodiments provided in the present application, it should be understood that the disclosed system, apparatus and method may be implemented in other ways. For example, the foregoing apparatus embodiment is only illustrative. For example, the division of the units is only one logical function division. In practice, there may be other division methods. For example, multiple units or assemblies may be combined or integrated into another system, or some features may be ignored or not executed. In addition, the illustrated or discussed mutual coupling or direct coupling or communication connection may be indirect coupling or communication connection through some interfaces, apparatuses or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to achieve the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in a form of software functional unit.

The integrated units, if being implemented in the form of software functional unit and taken as an independent product to sell or use, may also be stored in one computer-readable storage medium. Based on such understanding, the essence of the technical solution of the present application, or a part contributing to the prior art, or all or a part of the technical solution may be embodied in a form of software product. The computer software product is stored in one storage medium including a number of instructions such that a computer device (which may be a personal computer, a server, or a network device, etc.) executes all or a part of steps of the method in the embodiments of the present application. The foregoing storage medium comprises: any medium capable of storing program codes, such as a USB disk, a mobile hard disk, a Read-Only Memory (ROM), a Random Access Memory (RAM), a stable memory (non-volatile memory), a non-volatile memory computer-readable storage media, a magnetic disk, or an optical disk.

As described above, the embodiments above are only used to illustrate the technical solution of the present application, and are not intended to limit the present application. Although the present application has been described in detail with reference to the above-mentioned embodiments, those of ordinary skills in the art should understand that: the technical solution recorded in the above-mentioned embodiments can still be modified, or equivalent substitutions can be made to a part of the technical features in the embodiments. However, these modifications or substitutions should not depart from the spirit and scope of the technical solution of the embodiments of the present application.

We claim:

1. A polarity discrimination detection method for multiple stacked electronic components, comprising the following steps of:

acquiring a collected image of a to-be-detected electronic component, and matching and positioning the collected image to obtain a positioning image in which the to-be-detected electronic component is positioned;

acquiring parameter data of a camera device corresponding to the collected image, and carrying out stereo matching and image segmentation on the positioning image according to the parameter data to obtain three-dimensional coordinates of the to-be-detected electronic component;

moving the to-be-detected electronic component to a polarity detection region through a manipulator according to the three-dimensional coordinates to acquire a detection image of the to-be-detected electronic component;

analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component; wherein, the carrying out stereo matching and image segmentation on the positioning image according to the parameter data to obtain the three-dimensional coordinates of the to-be-detected electronic component, comprises:

carrying out Gamma correction and filtering on the positioning image to obtain a preprocessed image;

carrying out stereo matching on the preprocessed image by an improved Census matching algorithm to obtain a disparity image;

carrying out image segmentation on the disparity image by a region growing segmentation algorithm based on disparity to obtain a segmented image; and acquiring coordinate data of the to-be-detected electronic component in the segmented image in a coordinate system of the camera device, and calculating the three-dimensional coordinates of the to-be-detected electronic component according to the parameter data and the coordinate data;

wherein, the camera device is a binocular camera, and then two corresponding preprocessed images are obtained, and the carrying out stereo matching on the preprocessed image by the improved Census matching algorithm to obtain the disparity image, comprises:

dividing each preprocessed image into four sub-regions by a Census transform window to acquire a pixel uniformity of each sub-region;

calculating a gray value of a central pixel corresponding to each preprocessed image according to all pixel uniformities;

carrying out one-dimensional aggregation on each preprocessed image according to the gray value of the central pixel by a multipath cost aggregation algorithm to obtain two corresponding disparity-refined images; and according to a pixel distance difference between corresponding pixel points of the two disparity-refined images, forming one of the pixel points corresponding to the pixel distance difference which meets a difference threshold into the disparity image;

the calculating the gray value of the central pixel corresponding to each preprocessed image, comprises:
selecting two sub-regions corresponding to a maximum pixel uniformity and a minimum pixel uniformity from all pixel uniformities; when a difference between average gray values of the two sub-regions is less than or equal to a gray threshold, taking the average gray values of the two sub-regions as the gray value of the central pixel; when the difference between the average gray values of the two sub-regions is greater than the gray threshold, selecting a gray median of the sub-region corresponding to the maximum pixel uniformity and the average gray value of the sub-region corresponding to the minimum pixel uniformity for weighted average, and taking a weighted average value as the gray value of the central pixel.

2. The polarity discrimination detection method for the multiple stacked electronic components according to claim 1, wherein the matching and positioning the collected image to obtain the positioning image in which the to-be-detected electronic component is positioned, comprises:

acquiring a template image of the electronic component, and preprocessing and rotating the template image to obtain a rotated template image;

binarizing and filtering the collected image to obtain a processed collected image; and constructing an image pyramid according to the processed collected image to obtain a to-be-searched image;

carrying out NCC matching on the to-be-searched image and the rotated template image by an NCC matching algorithm to obtain M matching values; and sorting the M matching values from largest to smallest, selecting pixel positions corresponding to the first N sorted matching values as N target to-be-detected electronic components for searching and positioning, and forming the N target to-be-detected electronic components into a two-dimensional positioning image.

3. The polarity discrimination detection method for the multiple stacked electronic components according to claim 1, wherein the calculating the three-dimensional coordinates of the to-be-detected electronic component according to the parameter data and the coordinate data, comprises:

calculating a disparity value of the to-be-detected electronic component by a disparity calculation formula according to the coordinate data and the parameter data; and calculating the three-dimensional coordinates of the to-be-detected electronic component by a coordinate calculation formula according to the parameter data, the disparity value and the coordinate data; wherein, the disparity calculation formula is:

$$d = f\frac{X}{Z} - f\frac{(X-B)}{Z};$$

and
the coordinate calculation formula is:

$$x = \frac{B*X}{d}$$
$$y = \frac{B*y}{d}$$
$$z = \frac{B*f}{d};$$

wherein, d is the disparity value of the to-be-detected electronic component, f is a focal length of the parameter data, B is a baseline distance of the parameter data, X, Y and Z are the coordinate data of the to-be-detected electronic component on an X-axis, a Y-axis and a Z-axis in the coordinate system of the camera device, and x, y and z are the three-dimensional coordinates of the to-be-detected electronic component on the X-axis, the Y-axis and the Z-axis.

4. The polarity discrimination detection method for the multiple stacked electronic components according to claim 1, wherein the analyzing the detection image to obtain the polarity circle coordinates of the to-be-detected electronic component; and comparing the polarity circle coordinates with the polarity circle standard coordinates arranged on the polarity detection region to obtain the polarity discrimination result of the to-be-detected electronic component, comprises:

carrying out polarity circle positioning on the detection image by a contour search function of a contour detection algorithm to obtain a polarity circle;

determining a center of circle corresponding to the polarity circle through a plurality of circular boundary points of the polarity circle;

acquiring coordinates of the center of circle and taking the coordinates of the center of circle as the polarity circle coordinates; and when a difference between the polarity circle coordinates and the polarity circle standard coordinates meets a set difference value, taking the polarity discrimination result of the to-be-detected electronic component as a correct result; and when the difference between the polarity circle coordinates and the polarity circle standard coordinates does not meet the set difference value, taking the polarity discrimination result of the to-be-detected electronic component as a wrong result.

5. A polarity discrimination detection apparatus for multiple stacked electronic components, comprising a matching and positioning module, a matching and segmenting module, a moving and acquiring module, and a polarity discrimination module; wherein, the matching and positioning module is configured for acquiring a collected image of a to-be-detected electronic component, and matching and positioning the collected image to obtain a positioning image in which the to-be-detected electronic component is positioned;

the matching and segmenting module is configured for acquiring parameter data of a camera device corresponding to the collected image, and carrying out stereo matching and image segmentation on the positioning image according to the parameter data to obtain three-dimensional coordinates of the to-be-detected electronic component;

the moving and acquiring module is configured for moving the to-be-detected electronic component to a polarity detection region through a manipulator according to the three-dimensional coordinates to acquire a detection image of the to-be-detected electronic component; and the polarity discrimination module is configured for analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component;

the matching and segmenting module comprises a third processing submodule, a stereo matching submodule, an image segmentation submodule and a coordinate calculation submodule;

the third processing submodule is configured for carrying out Gamma correction and filtering on the positioning image to obtain a preprocessed image;

the stereo matching submodule is configured for carrying out stereo matching on the preprocessed image by an improved Census matching algorithm to obtain a disparity image;

the image segmentation submodule is configured for carrying out image segmentation on the disparity image by a region growing segmentation algorithm based on disparity to obtain a segmented image; and the coordinate calculation submodule is configured for acquiring coordinate data of the to-be-detected electronic component in the segmented image in a coordinate system of the camera device, and calculating the three-dimensional coordinates of the to-be-detected electronic component according to the parameter data and the coordinate data;

wherein, the camera device is a binocular camera, and then two corresponding preprocessed images are obtained, and the carrying out stereo matching on the preprocessed image by the improved Census matching algorithm to obtain the disparity image, comprises:

dividing each preprocessed image into four sub-regions by a Census transform window to acquire a pixel uniformity of each sub-region;

calculating a gray value of a central pixel corresponding to each preprocessed image according to all pixel uniformities;

carrying out one-dimensional aggregation on each preprocessed image according to the gray value of the central pixel by a multipath cost aggregation algorithm to obtain two corresponding disparity-refined images; and according to a pixel distance difference between corresponding pixel points of the two disparity-refined images, forming one of the pixel points corresponding to the pixel distance difference which meets a difference threshold into the disparity image;

the calculating the gray value of the central pixel corresponding to each preprocessed image, comprises: selecting two sub-regions corresponding to a maximum pixel uniformity and a minimum pixel uniformity from all pixel uniformities; when a difference between average gray values of the two sub-regions is less than or equal to a gray threshold, taking the average gray values of the two sub-regions as the gray value of the central pixel; when the difference between the average gray values of the two sub-regions is greater than the gray threshold, selecting a gray median of the sub-region corresponding to the maximum pixel uniformity and the average gray value of the sub-region corresponding to the minimum pixel uniformity for weighted average, and taking a weighted average value as the gray value of the central pixel.

6. The polarity discrimination detection apparatus for the multiple stacked electronic components according to claim 5, wherein the matching and positioning module comprises a first processing submodule, a second processing submodule, a matching submodule and a positioning submodule;

the first processing submodule is configured for acquiring a template image of the electronic component, and preprocessing and rotating the template image to obtain a rotated template image;

the second processing submodule is configured for binarizing and filtering the collected image to obtain a processed collected image; and constructing an image pyramid according to the processed collected image to obtain a to-be-searched image;

the matching submodule is configured for carrying out NCC matching on the to-be-searched image and the rotated template image by an NCC matching algorithm to obtain M matching values; and the positioning submodule is configured for sorting the M matching values from largest to smallest, selecting pixel positions corresponding to the first N sorted matching values as N target to-be-detected electronic components for searching and positioning, and forming the N target to-be-detected electronic components into a two-dimensional positioning image.

7. An terminal device, comprising a processor and a storage, wherein:
the storage is used for storing a program code and transmitting the program code to the processor; and
the processor is used for executing a polarity discrimination detection method for the multiple stacked electronic components based on an instruction in the program code;
the polarity discrimination detection apparatus for the multiple stacked electronic components comprises the following steps of:
acquiring a collected image of a to-be-detected electronic component, and matching and positioning the to-be-detected collected image to obtain a positioning image in which the to-be-detected electronic component is positioned;
acquiring parameter data of a camera device corresponding to the collected image, and carrying out stereo matching and image segmentation on the positioning image according to the parameter data to obtain three-dimensional coordinates of the to-be-detected electronic component;
moving the to-be-detected electronic component to a polarity detection region through a manipulator according to the three-dimensional coordinates to acquire a detection image of the to-be-detected electronic component;
analyzing the detection image to obtain polarity circle coordinates of the to-be-detected electronic component; and comparing the polarity circle coordinates with polarity circle standard coordinates arranged on the polarity detection region to obtain a polarity discrimination result of the to-be-detected electronic component; wherein,
the carrying out stereo matching and image segmentation on the positioning image according to the parameter data to obtain the three-dimensional coordinates of the to-be-detected electronic component, comprises:
carrying out Gamma correction and filtering on the positioning image to obtain a preprocessed image;
carrying out stereo matching on the preprocessed image by an improved Census matching algorithm to obtain a disparity image;

carrying out image segmentation on the disparity image by a region growing segmentation algorithm based on disparity to obtain a segmented image; and acquiring coordinate data of the to-be-detected electronic component in the segmented image in a coordinate system of the camera device, and calculating the three-dimensional coordinates of the to-be-detected electronic component according to the parameter data and the coordinate data;

wherein, the camera device is a binocular camera, and then two corresponding preprocessed images are obtained, and the carrying out stereo matching on the preprocessed image by the improved Census matching algorithm to obtain the disparity image, comprises:

dividing each preprocessed image into four sub-regions by a Census transform window to acquire a pixel uniformity of each sub-region;

calculating a gray value of a central pixel corresponding to each preprocessed image according to all pixel uniformities;

carrying out one-dimensional aggregation on each preprocessed image according to the gray value of the central pixel by a multipath cost aggregation algorithm to obtain two corresponding disparity-refined images; and according to a pixel distance difference between corresponding pixel points of the two disparity-refined images, forming one of the pixel points corresponding to the pixel distance difference which meets a difference threshold into the disparity image;

the calculating the gray value of the central pixel corresponding to each preprocessed image, comprises: selecting two sub-regions corresponding to a maximum pixel uniformity and a minimum pixel uniformity from all pixel uniformities; when a difference between average gray values of the two sub-regions is less than or equal to a gray threshold, taking the average gray values of the two sub-regions as the gray value of the central pixel; when the difference between the average gray values of the two sub-regions is greater than the gray threshold, selecting a gray median of the sub-region corresponding to the maximum pixel uniformity and the average gray value of the sub-region corresponding to the minimum pixel uniformity for weighted average, and taking a weighted average value as the gray value of the central pixel.

* * * * *